United States Patent
Zhu et al.

(10) Patent No.: US 6,449,097 B1
(45) Date of Patent: Sep. 10, 2002

(54) DIFFRACTION GRATING FOR WAVELENGTH DIVISION MULTIPLEXING/DEMULTIPLEXING DEVICES

(75) Inventors: Ninghui Zhu, Winchester, MA (US); Ian Turner, Stratham; Yuri A. Yudin, Nashua, both of NH (US); Mikhail N. Sokolskiy, St. Petersburg (RU); Robert K. Wade, Boca Raton, FL (US)

(73) Assignee: Lightchip, Inc., Salem, NH (US)

( * ) Notice: Subject to any disclaimer, the term of this patent is extended or adjusted under 35 U.S.C. 154(b) by 0 days.

(21) Appl. No.: 09/587,266

(22) Filed: Jun. 5, 2000

(51) Int. Cl.[7] .................................................. G02B 5/18
(52) U.S. Cl. ...................... 359/576; 359/566; 359/569; 359/900
(58) Field of Search .............................. 359/576, 572, 359/571, 570, 569, 566, 130; 385/37; 264/1.31, 1.9

(56) References Cited

U.S. PATENT DOCUMENTS

| | | | |
|---|---|---|---|
| 3,698,795 A | * 10/1972 | Flint | 359/572 |
| 4,758,090 A | * 7/1988 | Schuma | 356/483 |
| 5,377,044 A | * 12/1994 | Tomono et al. | 250/231.16 |
| 5,457,573 A | * 10/1995 | Iida et al. | 359/576 |
| 5,786,931 A | * 7/1998 | Speckbacher et al. | 359/566 |
| 5,991,482 A | * 11/1999 | Laude | 385/37 |
| 6,285,500 B1 | * 9/2001 | Ranalli et al. | 359/127 |

FOREIGN PATENT DOCUMENTS

| | | | | |
|---|---|---|---|---|
| CA | 0591848 | * | 2/1960 | 359/566 |
| EP | 0297437 | * | 1/1989 | 385/37 |
| GB | 2082343 A | * | 3/1982 | 359/566 |
| JP | 40-610247 A | * | 4/1994 | 359/566 |

OTHER PUBLICATIONS

Von H. Dislich, et al., "Uber ein Verfahren zum Herstellen von Kunstoff–Beugungsgittern mit behinderter thermischer Ausdehnung", OPTIK 28, Heft 2, pp. 126–131, 1968/1969.*

* cited by examiner

*Primary Examiner*—Cassandra Spyrou
*Assistant Examiner*—John Juba, Jr.
(74) *Attorney, Agent, or Firm*—Jenkens & Gilchrist, P.C.

(57) ABSTRACT

An improved diffraction grating for wavelength division multiplexing/demultiplexing devices is disclosed. The improved diffraction grating has a glass substrate, a polymer grating layer located adjacent to the glass substrate, and a metal coating layer located adjacent to the polymer grating layer. The improvement comprises a polymer coating layer located adjacent to the metal coating layer, and a glass cover located adjacent to the polymer coating layer, wherein the polymer coating layer and the glass cover compensate for thermal characteristics associated with the polymer grating layer and the glass substrate, respectively.

28 Claims, 4 Drawing Sheets

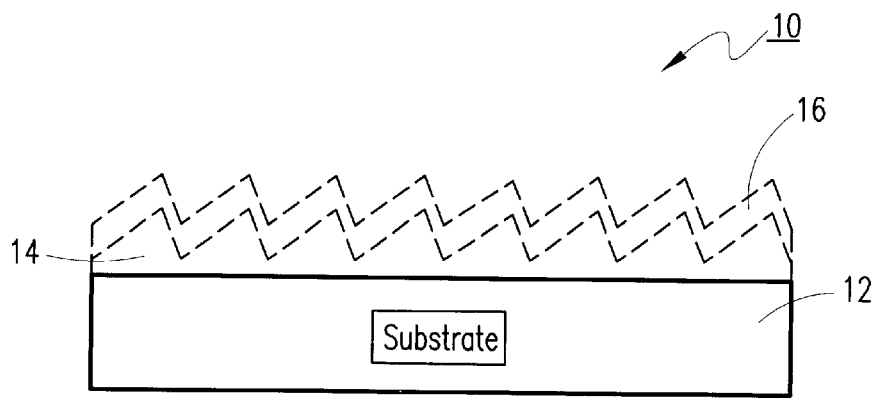
FIG. 1
(PRIOR ART)
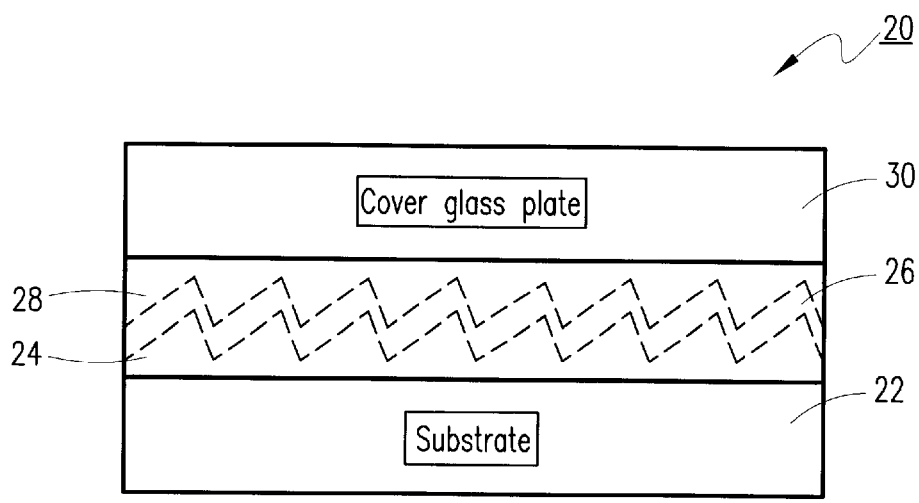
FIG. 4
| Glass Type | θ | CTE X10⁻⁶ | f | δd μm/°C | Total d (μm) @ δT=50°C |
|---|---|---|---|---|---|
| BK7 | 22 | 7.10 | 124 | 0.355704689 | 17.78523446 |
| BK3 | 22 | 5.30 | 124 | 0.265526036 | 13.27630178 |
| SiO2 | 22 | 0.60 | 124 | 0.030059551 | 1.502977560 |
| Clearceram-Z | 22 | 0.08 | 124 | 0.004007940 | 0.200397008 |
| Zerodur | 22 | 0.02 | 124 | 0.001001985 | 0.050099252 |
| ULE | 22 | 0.00 | 124 | 0.000000000 | 0.00000000 |
FIG. 6

DIFFRACTION GRATING FOR WAVELENGTH DIVISION MULTIPLEXING/DEMULTIPLEXING DEVICES

FIELD OF THE INVENTION

The present invention relates generally to wavelength division multiplexing and, more particularly, to an improved diffraction grating for wavelength division multiplexing/demultiplexing devices.

BACKGROUND OF THE INVENTION

Currently, approximately 70% of the wavelength division multiplexing (WDM) market in the United States utilize thin film filtering based multiplexing/demultiplexing devices. However, there are many difficulties associated with thin film filtering based multiplexing/demultiplexing devices. For example, for high channel count (i.e., 32 plus channels) multiplexing/demultiplexing devices, channel uniformity is important. However, due to the cascade configuration typically associated with thin film filtering based multiplexing/demultiplexing devices, channel uniformity simply cannot be maintained. That is, insertion losses will continually increase as light continues to be transmitted through each individual thin film filter.

Recently, multiplexing/demultiplexing devices incorporating array waveguide gratings (AWG's) have emerged as an attractive alternative to thin film filtering based multiplexing/demultiplexing devices due to their integrated compact structure and high channel count capabilities. However, AWG based multiplexing/demultiplexing devices still suffer from several intrinsic disadvantages such as high insertion loss, high channel crosstalk, and active temperature control. For example, although some recent laboratory experiments on AWG based multiplexing/demultiplexing devices have achieved insertion losses as low as 0.8 dB (on the chip level), commercially available AWG based multiplexing/demultiplexing devices still only achieve insertion losses on the order of 5–6 dB.

An alternative to both thin film filtering based multiplexing/demultiplexing devices and AWG based multiplexing/demultiplexing devices are bulk diffraction grating based multiplexing/demultiplexing devices. Bulk diffraction grating based multiplexing/demultiplexing devices are founded on well known technology and have many unique advantages such as, for example, very low insertion loss and high channel count capability. However, thermal instability and narrow channel passband are two major drawbacks which prevent bulk diffraction grating based multiplexing/demultiplexing devices from prevailing over other types of multiplexing/demultiplexing devices. For example, referring to FIG. 1, there is shown a typical diffraction grating 10 that is used in a typical bulk diffraction grating based multiplexing/demultiplexing device. The diffraction grating 10 comprises a glass substrate 12, a polymer grating layer 14 formed on the glass substrate 12, and a metal coating layer 16 formed on the polymer grating layer 14. The metal coating layer 16, which is used to increase the reflectivity of the diffraction grating 10, is typically formed of gold (Au) or aluminum (Al).

Problematically, thermal expansion of the material of the glass substrate 12 can change the groove spacing of the diffraction grating 10. In addition, differences in the coefficients of thermal expansion between the materials of the glass substrate 12, the polymer grating layer 14, and the metal coating layer 16 can cause non-uniform deformations in the diffraction grating 10 when the diffraction grating 10 is subject to variations in temperature such as, for example, variations in ambient temperature, thereby distorting the profile of the diffraction grating 10. These non-uniform deformations in the diffraction grating 10 can in turn cause the efficiency of the diffraction grating 10 to decrease. For example, referring to FIGS. 2 and 3, there are shown plots derived from experimental data showing changes in diffraction beam angle (i.e., grating dispersion) and grating groove density, respectively, due to temperature variations of the diffraction grating 10.

As can be seen from FIGS. 2 and 3, bulk diffraction grating based multiplexing/demultiplexing devices are extremely temperature sensitive. The thermal effects resulting from the temperature sensitivity associated with bulk diffraction grating based multiplexing/demultiplexing devices can generally be classified into one of two categories: 1.) diffraction grating dispersion change due to expansion/contraction of the substrate material; and 2.) diffraction grating efficiency decrease due to groove profile distortion. Obviously, it would be desirable to provide a technique for minimizing, or eliminating, these thermal effects resulting from the temperature sensitivity associated with bulk diffraction grating based multiplexing/demultiplexing devices in either one or both of these two categories. More particularly, it would be desirable to provide a technique for efficiently and cost effectively minimizing, or eliminating, the above-described thermal effects resulting from the temperature sensitivity associated with bulk diffraction grating based multiplexing/demultiplexing devices.

OBJECTS OF THE INVENTION

The primary object of the present invention is to provide an improved diffraction grating for wavelength division multiplexing/demultiplexing devices.

The above-stated primary object, as well as other objects, features, and advantages, of the present invention will become readily apparent to those of ordinary skill in the art from the following summary and detailed descriptions, as well as the appended drawings. While the present invention is described below with reference to preferred embodiment(s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, an improved diffraction grating for wavelength division multiplexing/demultiplexing devices is provided. The improved diffraction grating has a glass substrate, a polymer grating layer located adjacent to the glass substrate, and a metal coating layer located adjacent to the polymer grating layer. The improvement comprises a polymer coating layer located adjacent to the metal coating layer, and a glass cover located adjacent to the polymer coating layer, wherein the polymer coating layer and the glass cover compensate for thermal characteristics associated with the polymer grating layer and the glass substrate, respectively.

In accordance with other aspects of the present invention, the glass substrate and the glass cover are beneficially formed of the same material and have substantially the same thickness. Ideally, the glass substrate and the glass cover are formed of a material having a low coefficient of thermal expansion. For example, the glass substrate and the glass cover are preferably formed of a material from the group consisting of: fused $SiO_2$; CLEARCERAM-Z, manufactured by Ohara, Inc.; ZERODUR®, manufactured by Schott Glass Technologies, Inc.; ULE®, manufactured by Corning, Inc.; and other glass materials having similar characteristics. Also, the glass substrate and the glass cover each ideally have a thickness range of 3 to 8 mm.

In accordance with further aspects of the present invention, the polymer grating layer and the polymer coating layer are beneficially formed of the same material and have substantially the same thickness. Ideally, the polymer grating layer and the polymer coating layer are formed of an epoxy material having at least some, and preferably all, of the characteristics of: a high Tg; a low viscosity; a low linear volume shrinkage; and a relatively high flexibility. For example, the polymer grating layer and the polymer coating layer are preferably formed of a material from the group consisting of: OG198-50 manufactured by Epoxy Technology, Inc.; OG198-53 manufactured by Epoxy Technology, Inc.; and other epoxy materials having similar characteristics. Also, the polymer grating layer and the polymer coating layer each ideally have a thickness range of 25 to 50 μm.

In accordance with still further aspects of the present invention, the material of the polymer grating layer and the material of the glass cover are preferably optically matched.

According to the present invention, an athermal diffraction grating for wavelength division multiplexing/demultiplexing devices is also provided. The athermal diffraction grating comprises a glass substrate, a polymer grating layer located adjacent to the glass substrate, a metal coating layer located adjacent to the polymer grating layer, a polymer coating layer located adjacent to the metal coating layer, and a glass cover located adjacent to the polymer coating layer.

According to the present invention, a method for fabricating an improved diffraction grating for wavelength division multiplexing/demultiplexing devices is further provided. The improved diffraction grating has a glass substrate, a polymer grating layer located adjacent to the glass substrate, and a metal coating layer located adjacent to the polymer grating layer. The method comprises forming a polymer coating layer adjacent to the metal coating layer, and then forming a glass cover adjacent to the polymer coating layer, wherein the polymer coating layer and the glass cover compensate for thermal characteristics associated with the polymer grating layer and the glass substrate, respectively.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 is a side cross-sectional view of a typical prior art diffraction grating having a glass substrate, a polymer grating layer, and a metal coating layer for use in a typical prior art bulk diffraction grating based multiplexing/demultiplexing device.

FIG. 4 is a side cross-sectional view of a diffraction grating having a glass substrate, a polymer grating layer, a metal coating layer, a polymer coating layer, and a glass cover in accordance with the present invention.

FIG. 6 is a table containing the resulting diffraction spot movement for several different glass materials in accordance with the present invention.

DETAILED DESCRIPTION OF EXEMPLARY EMBODIMENT(S)

Figure 2:
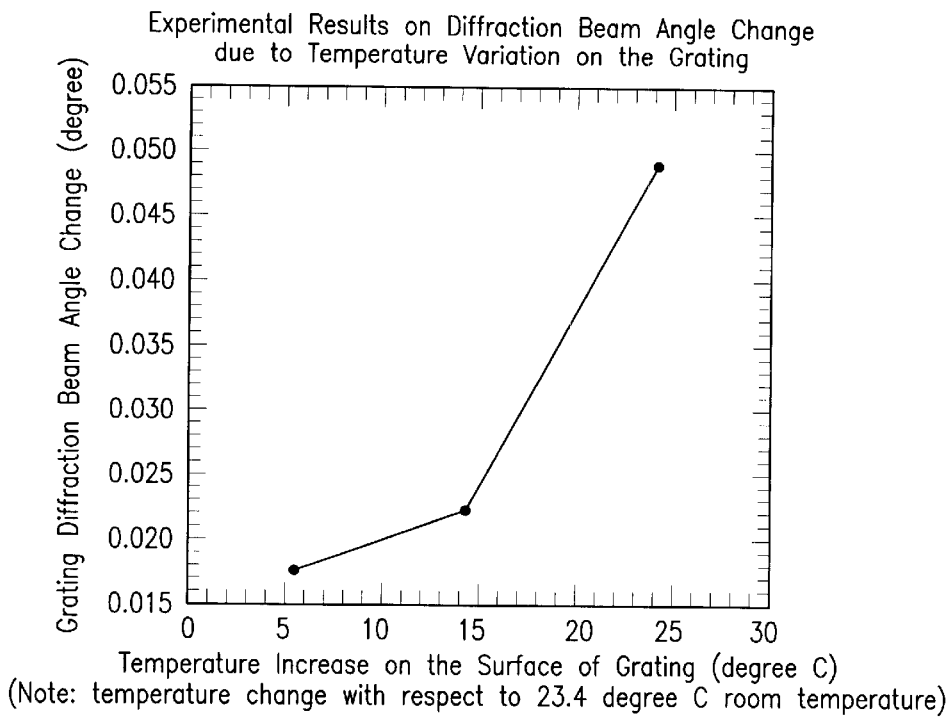
FIG. 2 is a plot showing changes in diffraction beam angle due to temperature variations in the prior art diffraction grating shown in FIG. 1.
Figure 3:
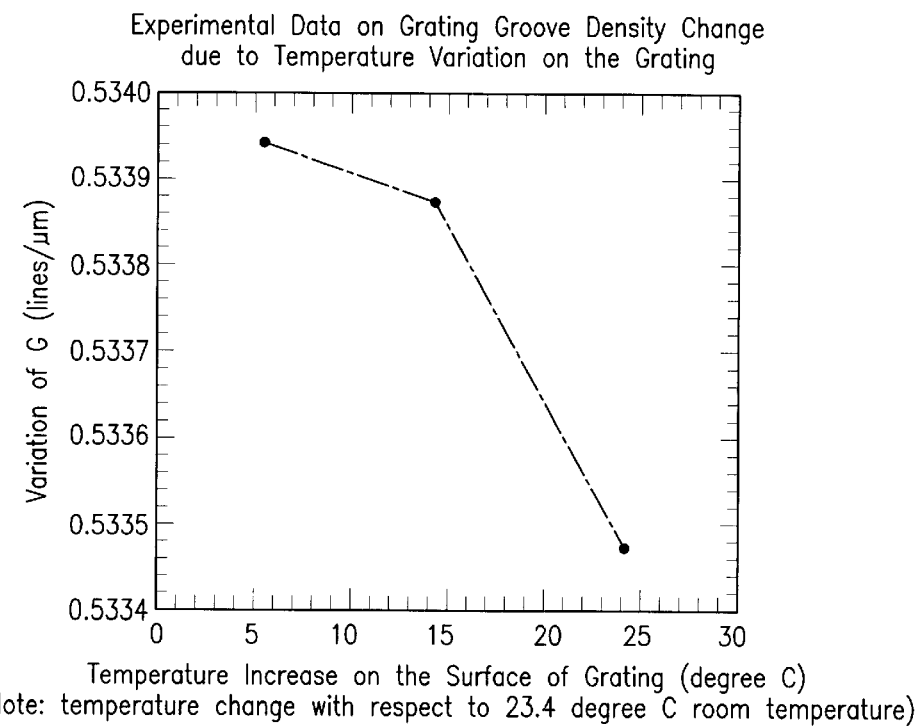
FIG. 3 is a plot showing changes in grating groove density due to temperature variations in the prior art diffraction grating shown in FIG. 1.

Referring to FIG. 4, there is shown an improved diffraction grating 20 for use in a bulk diffraction grating based multiplexing/demultiplexing device in accordance with the present invention. The improved diffraction grating 20 comprises a glass substrate 22, a polymer grating layer 24 located adjacent to the glass substrate 22, a metal coating layer 26 located adjacent to the polymer grating layer 24, a polymer coating layer 28 located adjacent to the metal coating layer 26, and a glass cover 30 located adjacent to the polymer coating layer 28. The metal coating layer 26, which is used to increase the reflectivity of the improved diffraction grating 20, is typically formed of gold (Au) or aluminum (Al) and typically has a thickness in the range of 0.05 to 0.5 μm.

With the basic structure of the improved diffraction grating 20 now described, important characteristics of the improved diffraction grating 20 will now be discussed. That is, while the present invention centers around the basic construction of the improved diffraction grating 20 for use in bulk diffraction grating based multiplexing/demultiplexing devices, the improvements in the improved diffraction grating 20 are based upon two important characteristics which are incorporated into the basic construction of the improved diffraction grating 20. These two important characteristics are: 1.) the geometries of the individual components of the diffraction grating 20; and 2.) the materials used for the individual components of the diffraction grating 20.

To provide an overview of the two important characteristics which are incorporated into the basic construction of the improved diffraction grating 20, it is useful to note that the differences between the prior art diffraction grating 10 and the improved diffraction grating 20 are the addition of the polymer coating layer 28 and the glass cover 30. Thus, in the improved diffraction grating 20, the grating groove profile is sandwiched between the two polymer layers 24 and 28, and the two polymer layers 24 and 28 are in turn sandwiched between the glass substrate 22 and the glass cover 30. In view of the foregoing, it should now be revealed that, in accordance with the first important characteristic discussed above, the thickness of glass cover 30 and the glass substrate 22 is preferably the same. Also, in accordance with the second important characteristic discussed above, the material that is used for the glass substrate 22 and the glass cover 30 is preferably the same and chosen from very low thermal expansion glass materials. Further, in accordance with the second important characteristic discussed above, the material that is used for both the polymer grating layer 24 and the polymer coating layer 28 is preferably a high glass transition temperature (Tg), low viscosity, low shrinkage optical epoxy. These important characteristics which are incorporated into the basic construction of the improved diffraction grating 20 will now be discussed in more detail.

The symmetrical nature of the improved diffraction grating 20 allows grating groove profile distortions to be attenuated. That is, the presence of the glass cover 30 and the polymer coating layer 28 causes the improved diffraction grating 20 to be symmetrical. Also, the glass cover 30 is preferably the same thickness as the glass substrate 22, and the polymer coating layer 28 is preferably the same thickness as the polymer grating layer 24. Thus, any thermal expansion/contraction of the glass substrate 22 should be duplicated in the glass cover 30. Similarly, but to a lesser extent because of the smaller thicknesses involved as will be discussed in detail below, any thermal expansion/contraction of the polymer grating layer 24 should be duplicated in the polymer coating layer 28.

Figure 5:
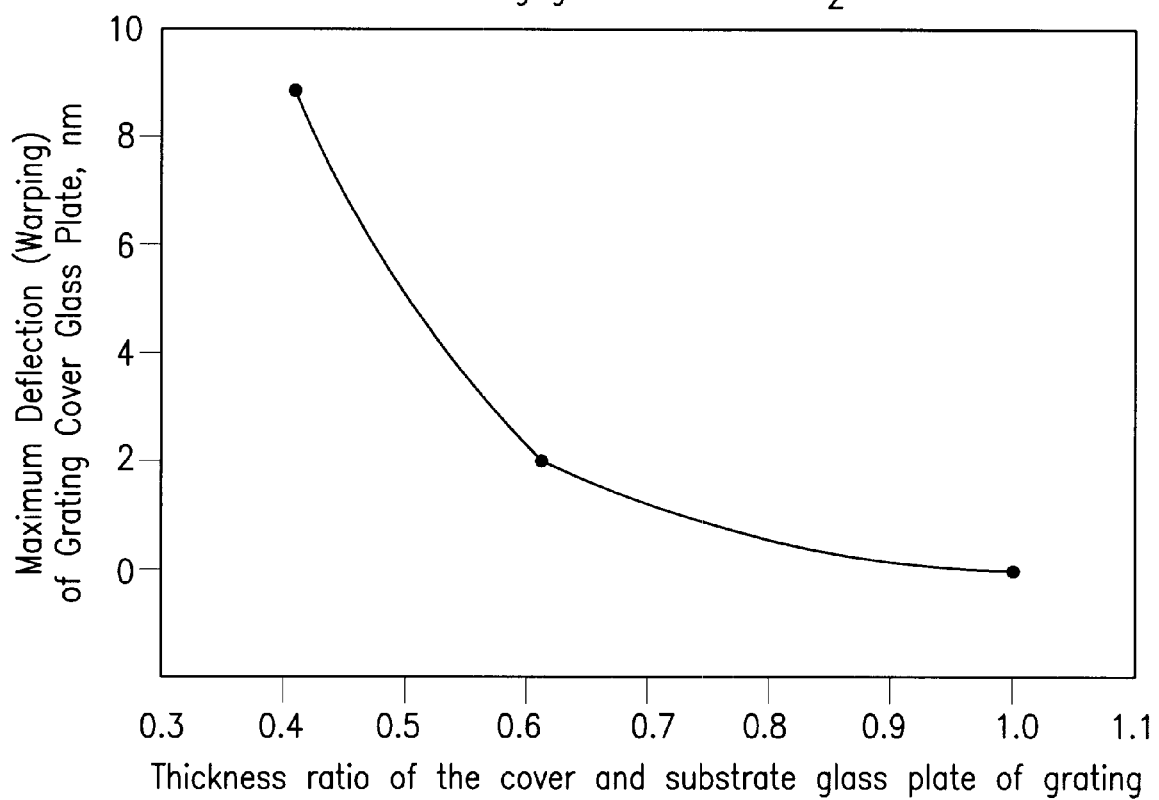
FIG. 5 is a plot showing the effect of the thickness ratio of the glass cover and the glass substrate on grating warping in accordance with the present invention.

It should be noted that a mismatch in the coefficients of thermal expansion (CTE) between the material of the glass substrate 22 and the material of the glass cover 30 can still cause warping of the grating even if the glass substrate 22 and the glass cover 30 have the same thicknesses. This warping can force a planar grating into a curved grating. A curved grating will obviously distort the grating groove profile. Thus, the preferred approach is to use the same material and thickness for both the glass cover 30 and the glass substrate 22. Referring to FIG. 5, there is shown a plot showing the effect of the thickness ratio of the glass cover 30 and the glass substrate 22 on grating warping. A typical material thickness for both the glass cover 30 and the glass substrate 22 is in the range of 3 to 8 mm. The above-described material type and thickness concepts also apply to the polymer grating layer 24 and the polymer coating layer 28, but to a lesser extent because of the smaller thicknesses involved as will be discussed in detail below.

The choice of materials is important to minimize the overall thermal effects. For example, any movement of a diffraction spot for a bulk diffraction grating based multiplexing/demultiplexing device under a 1° C. temperature change can be approximately expressed by the following equation, provided that the effect of temperature-induced refractive index change is ignored, $$\delta d = \alpha f \tan\theta$$

wherein $\delta d$ is the diffraction spot movement, $\alpha$ is the CTE of the glass material used in the diffraction grating, f is the focus distance of lens system in the bulk diffraction grating based multiplexing/demultiplexing device, and $\theta$ is the diffraction angle of the diffraction grating (this equals the angle of the diffraction grating with respect to the optical axis of the bulk diffraction grating based multiplexing/demultiplexing device at the Littrow condition).

Referring to FIG. 6, there is shown a table containing the resulting diffraction spot movement for several different glass materials. From this analysis, it is clear that using a low CTE material for the glass substrate 22 and the glass cover 30 can reduce the thermal-induced diffraction grating dispersion change. Glass materials having extra low CTE are particularly recommended for both the glass substrate 22 and the glass cover 30. For example, the following glass materials listed in order of improving performance are particularly recommended: 1.) fused $SiO_2$; 2.) CLEARCERAM-Z, manufactured by Ohara, Inc.; 3.) ZERODUR®, manufactured by Schott Glass Technologies, Inc.; and 4.) ULE®, manufactured by Corning, Inc.

Figure 7:
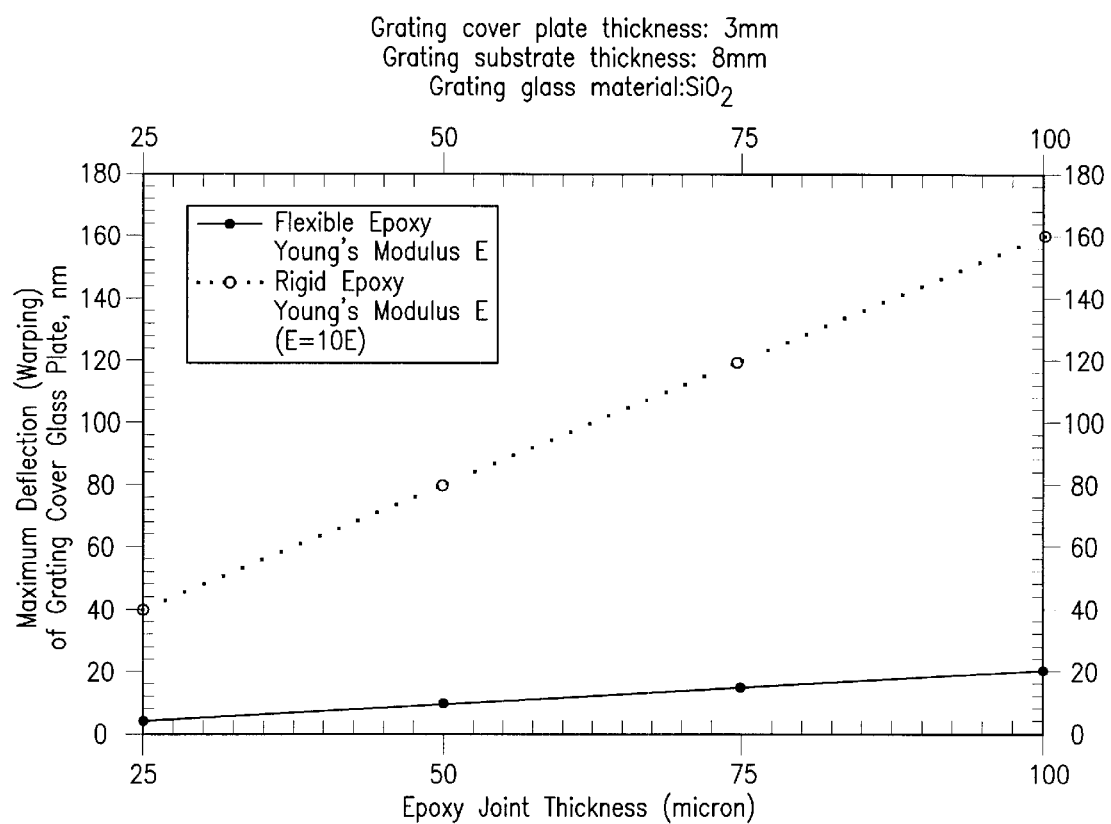
FIG. 7 is a plot showing grating warping as a function of epoxy joint thickness for a flexible epoxy and a rigid epoxy in accordance with the present invention.

Regarding the material and thickness to be used for the polymer grating layer 24 and the polymer coating layer 28, a comprehensive study has been performed to determine what kind of material is best fit for the polymer grating layer 24 and the polymer coating layer 28. Since the polymer grating layer 24 is typically replicated from a master diffraction grating, the material for the polymer grating layer 24 and the polymer coating layer 28 is preferably a settable epoxy. Other factors to consider include the glass transition temperature (Tg) of the epoxy, the viscosity of the epoxy, the linear volume shrinkage of the epoxy upon curing, and the rigidity of the epoxy after curing. Taking each in turn, the epoxy should have a high Tg to insure a stable thermal grating profile, even under the rigorous thermal tests required by the Bellcore qualification standards. A high Tg will also widen the process window for subsequent processes which may require thermal bake. The epoxy should also have low viscosity so as to smooth the replicating and covering operations, and thereby allow for the faithful replication of the optimized profile of the master diffraction grating. The epoxy should further have a low linear volume shrinkage upon curing so as to prevent distortion of the diffraction grating profile during the curing of the epoxy. Finally, the epoxy should be fairly flexible as can be seen from FIG. 7, which shows a plot of grating warping as a function of epoxy joint thickness (i.e., the combination of the polymer grating layer 24 and the polymer coating layer 28) for a flexible epoxy and a rigid epoxy. As can also be seen from FIG. 7, it is also important to keep the epoxy joint thickness to a minimum, but large enough to allow for thermal expansions/contractions without adversely effecting the grating since the CTE of epoxy is greater than that of glass. For this reason, among others (e.g., process limitations), an optimal epoxy layer thickness for both the polymer grating layer 24 and the polymer coating layer 28 is in the range of 25 to 50 $\mu$m.

An additional consideration for the epoxy material used in the polymer coating layer 28 in relation to the glass material used in the glass cover 30 is that they have to be optically matched since they are both in the optical path of the improved diffraction grating 20.

Taking into account all of the above-stated considerations, examples of epoxies for use in both the polymer grating layer 24 and the polymer coating layer 28 are OG198-50 and OG198-53, both manufactured by Epoxy Technology, Inc.

At this point it should be noted that due to the intrinsic characteristics just discussed, only epoxy-based adhesives were considered for grating replication and covering instead of, for example, acrylate-based adhesives. It should also be noted that an ultimate athermal characteristic for a bulk diffraction grating based multiplexing/demultiplexing device employing the improved diffraction grating 20 have to be realized upon an integrated device level. That is, a combination of optical design and mechanical design have to be carefully integrated so as to balance and offset the different optical and mechanical components and therefore achieve an ultimate athermal characteristic at the entire device level under a range of temperature variations.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An improved diffraction grating for wavelength division multiplexing/demultiplexing devices, the improved diffraction grating comprising:
    a glass substrate;
    a polymer grating layer located adjacent to the glass substrate;
    a metal coating layer located adjacent to the polymer grating layer;
    a polymer coating layer located adjacent to the metal coating layer; and
    a glass cover located adjacent to the polymer coating layer;
    wherein the polymer coating layer and the glass cover compensate for thermal characteristics associated with the polymer grating layer and the glass substrate, respectively, and the glass substrate and the glass cover are formed of the same material and have a coefficient of thermal expansion less than approximately $0.08 \times 10^{-6}/°C$.

2. The improved diffraction grating as defined in claim 1, wherein the glass substrate and the glass cover have substantially the same thickness.

3. The improved diffraction grating as defined in claim 2, wherein the glass substrate and the glass cover each have a thickness range of 3 to 8 mm.

4. The improved diffraction grating as defined in claim 1, wherein the polymer grating layer and the polymer coating layer are formed of the same material and have substantially the same thickness.

5. The improved diffraction grating as defined in claim 4, wherein the polymer grating layer and the polymer coating layer are formed of an epoxy material having at least some of the characteristics of: a high Tg; a low viscosity; a low linear volume shrinkage; and a relatively high flexibility.

6. The improved diffraction grating as defined in claim 4, wherein the polymer grating layer and the polymer coating layer each have a thickness range of 25 to 50 μm.

7. The improved diffraction grating as defined in claim 1, wherein the material of the polymer grating layer and the material of the glass cover are optically matched.

8. The improved diffraction grating of claim 1, wherein the glass cover and the glass substrate have a coefficient of thermal expansion that is less than approximately $0.02 \times 10^{-6}/°C$.

9. The improved diffraction grating of claim 1, wherein the glass cover and the glass substrate have a coefficient of thermal expansion that is approximately $0.00 \times 10^{-6}/°C$.

10. An athermal diffraction grating for wavelength division multiplexing/demultiplexing devices, the athermal diffraction grating comprising:
    a glass substrate;
    a polymer grating layer located adjacent to the glass substrate;
    a metal coating layer located adjacent to the polymer grating layer;
    a polymer coating layer located adjacent to the metal coating layer; and
    a glass cover located adjacent to the polymer coating layer, the glass substrate and the glass cover being formed of the same material and having a coefficient of thermal expansion less than approximately $0.08 \times 10^{-6}/°C$.

11. The athermal diffraction grating as defined in claim 10, wherein the glass substrate and the glass cover have substantially the same thickness.

12. The athermal diffraction grating as defined in claim 10, wherein the glass substrate and the glass cover each have a thickness range of 3 to 8 mm.

13. The athermal diffraction grating as defined in claim 10, wherein the polymer grating layer and the polymer coating layer are formed of the same material and have substantially the same thickness.

14. The athermal diffraction grating as defined in claim 13, wherein the polymer grating layer and the polymer coating layer are formed of an epoxy material having at least some of the characteristics of: a high Tg; a low viscosity; a low linear volume shrinkage; and a relatively high flexibility.

15. The athermal diffraction grating as defined in claim 13, wherein the polymer grating layer and the polymer coating layer each have a thickness range of 25 to 50 μm.

16. The athermal diffraction grating as defined in claim 10, wherein the material of the polymer grating layer and the material of the glass cover are optically matched.

17. The athermal diffraction grating of claim 10, wherein the glass cover and the glass substrate have a coefficient of thermal expansion that is less than approximately $0.02 \times 10^{-6}/°C$.

18. The improved diffraction grating of claim 10, wherein the glass cover and the glass substrate have a coefficient of thermal expansion that is approximately $0.00 \times 10^{-6}/°C$.

19. A method for fabricating an improved diffraction grating for wavelength division multiplexing/demultiplexing devices, the improved diffraction grating having a glass substrate, a polymer grating layer located adjacent to the glass substrate, and a metal coating layer located adjacent to the polymer grating layer, the method comprising the steps of:
    forming a polymer coating layer adjacent to the metal coating layer; and
    forming a glass cover adjacent to the polymer coating layer, the glass substrate and the glass cover being formed of the same material and having a coefficient of thermal expansion less than approximately $0.08 \times 10^{-6}/°C$;
    wherein the polymer coating layer and the glass cover compensate for thermal characteristics associated with the polymer grating layer and the glass substrate, respectively;
    wherein the polymer coating layer and the glass cover compensate for thermal characteristics associated with the polymer grating layer and the glass substrate, respectively.

20. The method as defined in claim 19, wherein the glass substrate and the glass cover are formed of the same material and have substantially the same thickness.

21. The method as defined in claim 20, wherein the glass substrate and the glass cover are formed of a material having a low coefficient of thermal expansion.

22. The method as defined in claim 20, wherein the glass substrate and the glass cover each have a thickness range of 3 to 8 mm.

23. The method as defined in claim 19, wherein the polymer grating layer and the polymer coating layer are formed of the same material and have substantially the same thickness.

24. The method as defined in claim 23, wherein the polymer grating layer and the polymer coating layer are formed of an epoxy material having at least some of the characteristics of: a high Tg; a low viscosity; a low linear volume shrinkage; and a relatively high flexibility.

25. The method as defined in claim 23, wherein the polymer grating layer and the polymer coating layer each have a thickness range of 25 to 50 μm.

26. The method as defined in claim 19, wherein the material of the polymer grating layer and the material of the glass cover are optically matched.

27. The method of claim 19, wherein the glass cover and the glass substrate have a coefficient of thermal expansion that is less than approximately $0.02 \times 10^{-6}/°C$.

28. The method of claim 19, wherein the glass cover and the glass substrate have a coefficient of thermal expansion that is approximately $0.00 \times 10^{-6}/°C$.

* * * * *

UNITED STATES PATENT AND TRADEMARK OFFICE
CERTIFICATE OF CORRECTION

PATENT NO.  : 6,449,097 B1  
DATED       : September 10, 2002  
INVENTOR(S) : Ninghui Zhu et al.

It is certified that error appears in the above-identified patent and that said Letters Patent is hereby corrected as shown below:

Drawings,
Figure 4, replace "Substrate" with -- Substrate Glass Plate --

Column 8,
Lines 51-54, delete "wherein the polymer coating layer and the glass cover compensate for thermal characteristics associated with the polymer grating layer and the glass substrate, respectively;"

Signed and Sealed this

Thirteenth Day of May, 2003

JAMES E. ROGAN
*Director of the United States Patent and Trademark Office*